(12) United States Patent
Hachisuka et al.

(10) Patent No.: US 9,013,269 B2
(45) Date of Patent: Apr. 21, 2015

(54) LOCK RELEASE APPARATUS

(75) Inventors: Keisuke Hachisuka, Nagoya (JP); Osamu Katayama, Nagoya (JP)

(73) Assignee: DENSO CORPORATION, Kariya (JP)

( * ) Notice: Subject to any disclaimer, the term of this patent is extended or adjusted under 35 U.S.C. 154(b) by 460 days.

(21) Appl. No.: 13/028,254

(22) Filed: Feb. 16, 2011

(65) Prior Publication Data

US 2011/0199184 A1 Aug. 18, 2011

(30) Foreign Application Priority Data

Feb. 18, 2010 (JP) .................................. 2010-33964

(51) Int. Cl.

| | |
|---|---|
| G05B 19/00 | (2006.01) |
| G05B 23/00 | (2006.01) |
| G06F 7/00 | (2006.01) |
| G06F 7/04 | (2006.01) |
| G06K 19/00 | (2006.01) |
| G08B 29/00 | (2006.01) |
| G08C 19/00 | (2006.01) |
| H04B 1/00 | (2006.01) |
| H04B 1/02 | (2006.01) |
| H04B 3/00 | (2006.01) |
| H04Q 1/00 | (2006.01) |
| H04Q 9/00 | (2006.01) |
| G07C 9/00 | (2006.01) |
| B60R 25/00 | (2013.01) |

(52) U.S. Cl.
CPC ............ *G07C 9/00182* (2013.01); *B60R 25/00* (2013.01); *G07C 2009/00809* (2013.01)

(58) Field of Classification Search
CPC ................. G07C 9/00182; G07C 2009/00793; B60R 25/24

USPC ......................................................... 340/5.64
See application file for complete search history.

(56) References Cited

U.S. PATENT DOCUMENTS

| | | | |
|---|---|---|---|
| 2006/0158322 A1* | 7/2006 | Pinckney ................. | 340/426.28 |
| 2009/0146506 A1* | 6/2009 | Iida et al. ..................... | 307/328 |
| 2009/0224895 A1* | 9/2009 | Ballard .................... | 340/426.11 |
| 2009/0319161 A1* | 12/2009 | Abendroth .................... | 701/112 |
| 2010/0214112 A1 | 8/2010 | Ishihara et al. | |

FOREIGN PATENT DOCUMENTS

| | | | |
|---|---|---|---|
| JP | 05-212597 A | | 8/1993 |
| JP | 2000198557 A | * | 7/2000 |
| JP | 2003-011783 | | 1/2003 |

(Continued)

OTHER PUBLICATIONS

Office Action dated Jan. 31, 2012 in corresponding JP Application No. 2010-033964 (and English translation).

*Primary Examiner* — George Bugg
*Assistant Examiner* — Anthony D Afrifa-Kyei
(74) *Attorney, Agent, or Firm* — Posz Law Group, PLC

(57) ABSTRACT

A lock release apparatus in a vehicle includes a vehicle unit and a portable device, for an exchange of the first and second reference signals transmitted therebetween from the portable device through human body of the driver toward the right and left hands of the driver onto the first and second interfaces. The signals received by the interfaces are used to set the first and second determination conditions. At a time of a shift lever operation, an interface on a shift lever is used to receive the first determination signal for determining the first determination condition, together with the second determination signal from the other interface for releasing the lock of the shift lever.

10 Claims, 7 Drawing Sheets

(56) References Cited

FOREIGN PATENT DOCUMENTS

| JP | 2003-194495 A | | 7/2003 |
|---|---|---|---|
| JP | 2009-138325 A | | 6/2009 |
| JP | 2009138325 A | * | 6/2009 |
| WO | WO 9628628 A1 | * | 9/1996 |
| WO | WO 2009/014212 | | 1/2009 |

* cited by examiner

LOCK RELEASE APPARATUS

CROSS REFERENCE TO RELATED APPLICATION

The present application is based on and claims the benefit of priority of Japanese Patent Application No. 2010-33964, filed on Feb. 18, 2010, the disclosure of which is incorporated herein by reference.

FIELD OF THE INVENTION

The present invention generally relates to a lock release mechanism that releases (i.e., unlocks) a lock of a subject apparatus, by transmitting a lock release signal from a user-held portable terminal to the lock release mechanism though human body that serves as a transmission path (i.e., a channel) of the signal.

BACKGROUND INFORMATION

Conventionally, a lock release mechanism is known, for example, as one disclosed in a Japanese patent document JP-A-2009-138325, which transmits an ID signal or the like from a portable terminal held by an occupant of the vehicle through human body to a vehicle controller that controls a lock mechanism when the occupant touches a door handle of the vehicle.

[Patent document 1] Japanese Patent Laid-Open No. 2009-138325

However, the above lock release mechanism releases a child lock, when a child occupant who does not have the portable terminal touches the door handle while the child occupant is touching another occupant who carries the portable terminal. Further, the above lock release mechanism "unintentionally" releases the child lock when the occupant having the portable terminal touches the door handle without knowing it while he/she tries to change his/her position in the driver's seat or the like.

In other words, the conventional lock release mechanism cannot prevent the "unintentional" unlocking of the lock caused by a third person who happens to touch a lock release button while he/she is in contact with a person who holds the portable terminal, or by a holder of the portable terminal who inadvertently operates the lock release button.

SUMMARY OF THE INVENTION

In view of the above and other problems, the present invention provides a lock release apparatus that suppresses unintentional unlocking of a lock, which is against a will of a holder of a portable terminal of the lock release apparatus.

In an aspect of the present invention, the lock release apparatus of the present invention includes: a control unit for controlling unlocking of a lock of a device when an unlocking operation unit of the device is operated; and a portable terminal for outputting a signal when the portable terminal is carried by an operator of the device. Further, the unlocking of the lock is performed by an operation of the unlocking operation unit by the operator, with a first body part of the operator placed on a first position of the device and a second body part of the operator placed on a second position of the device. When the device is started, the control unit performs a determination condition setting step by (a-1) receiving, as a first reference signal, a signal transmitted to the first body part from the portable terminal through an operator body and (a-2) setting a first determination condition for the unlocking of the lock based on a signal intensity of the first reference signal, and by (b-1) receiving, as a second reference signal, a signal transmitted to the second body part from the portable terminal through the operator body and (b-2) setting a second determination condition for the unlocking of the lock based on a signal intensity of the second reference signal, and when the unlocking operation unit is operated after performing the determination condition setting step, the control unit performs an unlocking instruction step to send an unlocking instruction to the lock by (c-1) receiving a signal received at the first position of the device which is recognized as a first determination signal and (c-2) determining that the first determination signal fulfills the first determination condition, and by (d-1) receiving a signal received at the second position of the device which is recognized as a second determination signal and (d-2) determining that the second determination signal fulfills the second determination condition.

Based on the above configuration, in an aspect of the present invention, the control unit sets the first determination condition based on the signal intensity of the signal that is transmitted to the first body part of the operator through the operator body from the portable terminal in the determination condition setting step at a time of start of the device, and then determines whether the signal intensity of the first determination signal received at the first position of the device fulfills the first determination condition in the unlocking instruction step when the unlocking operation unit is operated. Further, the control unit sets the second determination condition based on the signal intensity of the signal that is transmitted to the second body part of the operator through the operator body from the portable terminal in the determination condition setting step at a time of start of the device, and then determines whether the signal intensity of the second determination signal received at the second position of the device fulfills the second determination condition in the unlocking instruction step, when the unlocking operation unit is operated. Then, in the unlocking instruction step, the unlocking instruction is sent to the lock mechanism when the signal intensity of the first determination signal fulfills the first determination condition and the signal intensity of the second determination signal fulfills the second determination condition.

Therefore, when the unlocking operation unit is operated, the lock of the lock mechanism can be released, if the first body part of the operator is placed on the first position of the device and the second body part of the operator is placed on the second position of the device.

The operation scheme described above is effective and advantageous, because the first body part of the operator is placed on the first position of the device and the second body part of the operator, which is different from the first position, is placed on the second position of the device when the operator intends to release the lock of the device for the purpose of operating the device. In other words, when a person in contact with the operator, who carries the portable terminal and does not intends to release the lock, inadvertently operates the unlocking operation unit, or when the operator having the portable terminal unintentionally operates the unlocking operation unit, in an inadvertently-taken position or in an inadvertently-taken posture which is different from the position or the posture taken by a confidently-unlocking operator, the lock of the device will not be released.

Therefore, the unlocking of the lock by the operator having the portable terminal in an inadvertent manner, that is, by mistake, is prevented.

The lock release apparatus of the present invention, in another aspect, is configured in the following manner. That is, even if the signal intensity of the first determination signal fulfills the first determination condition and the signal intensity of the second determination signal fulfills the second determination condition in the unlocking instruction step, the control unit stops the sending of the unlocking instruction to the lock, when (a) the signal intensity of the second reference signal is higher than the signal intensity of the first reference signal and the signal intensity of the second determination signal is lower than the signal intensity of the second determination signal, or (b) the signal intensity of the second reference signal is lower than the signal intensity of the first reference signal and the signal intensity of the second determination signal is higher than the signal intensity of the second determination signal.

When the first determination condition and the second determination condition partially overlap with each other, due to, for example, closeness between the signal intensity of the first reference signal and the signal intensity of the second reference signal, the signal intensity of the first determination signal may occasionally fulfill the first determination condition and the signal intensity of the second determination signal may occasionally fulfill the second determination condition in case that the operator's first body part is placed on the second position of the device and the operator's second body part is placed on the first position of the device. However, the large-small relation between the signal intensities of the first body part and the second body part hardly reverses even when the environment is changed.

Therefore, the present invention in another aspect prevents false unlocking of the lock, even when the operator places the first body part on the second position and the second body part on the first position thereby fulfilling the first determination condition and the second determination condition in a position or posture that is different from the one taken under intention of releasing the lock. In other words, the false releasing of the lock is securely prevented when the operator with the portable terminal does not have an intention to release the lock.

In yet another aspect of the present invention claiming the lock release apparatus, the device is a vehicle, and the operator is a driver of the vehicle.

In still yet another aspect of the present invention claiming the lock release apparatus, the first body part is a left hand of the driver and the second body part is a right hand of the driver.

In still yet another aspect of the present invention claiming the lock release apparatus, the first body part is a hand of the driver and the second body part is a foot of the driver.

In still yet another aspect of the present invention claiming the lock release apparatus, the vehicle is equipped with a seating detector for detecting whether the driver is seated in a driver's seat, and the control unit stops the sending of the unlocking instruction to the lock when the seating detector is not detecting the driver's seating.

Based on the above operation scheme, the release of the lock is prevented if the driver is not detected to be seating, even when the unlocking operation unit is operated with the first body part of the driver placed on the first position and the second body part of the driver placed on the second position. The driver not in the driver's seat is assumed not to have an intention to release the lock, thereby unintentional unlocking is advantageously prevented.

In still yet another aspect of the present invention claiming the lock release apparatus, the control unit updates the first determination condition and the second determination condition by repeating the determination condition setting step when (a) the vehicle in operation has a shift lever of an automatic transmission set at a parking position with the parking position setting released afterwards, or (b) the vehicle in operation has a parking brake set at a braking condition with the braking condition released afterwards.

In above two cases of (a) and (b), that is, when the vehicle's operation is interrupted, the position of the portable terminal carried by the driver may easily be changed from the right trouser pocket to the left pocket, for example. Even in that case, the first and second determination conditions are updated by repeating the determination condition setting step, thereby preventing the false unlocking of the door lock when the driver does not have the intention of unlocking.

In still yet another aspect of the present invention claiming the lock release apparatus, the device is a machine tool.

In still yet another aspect of the present invention claiming the lock release apparatus, the first body part is a left hand of the operator and the second body part is a right hand of the operator.

In still yet another aspect of the present invention claiming the lock release apparatus, the machine tool is equipped with a standing position detector for detecting whether the operator is standing at an operation position, and the control unit stops the sending of the unlocking instruction to the lock when the standing position detector is not detecting that the operator is standing at the operation position.

Based on the above configuration, even by the operator with the first body part placed on the first position of the machine tool and the second body part placed on the second position of the machine tool, the unlocking of the machine tool is prevented in case that the operator is not standing at the predetermined operation position. The operator not in a predetermined position is assumed not to have an intention to release the lock, thereby false unlocking of the machine tool is advantageously prevented.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
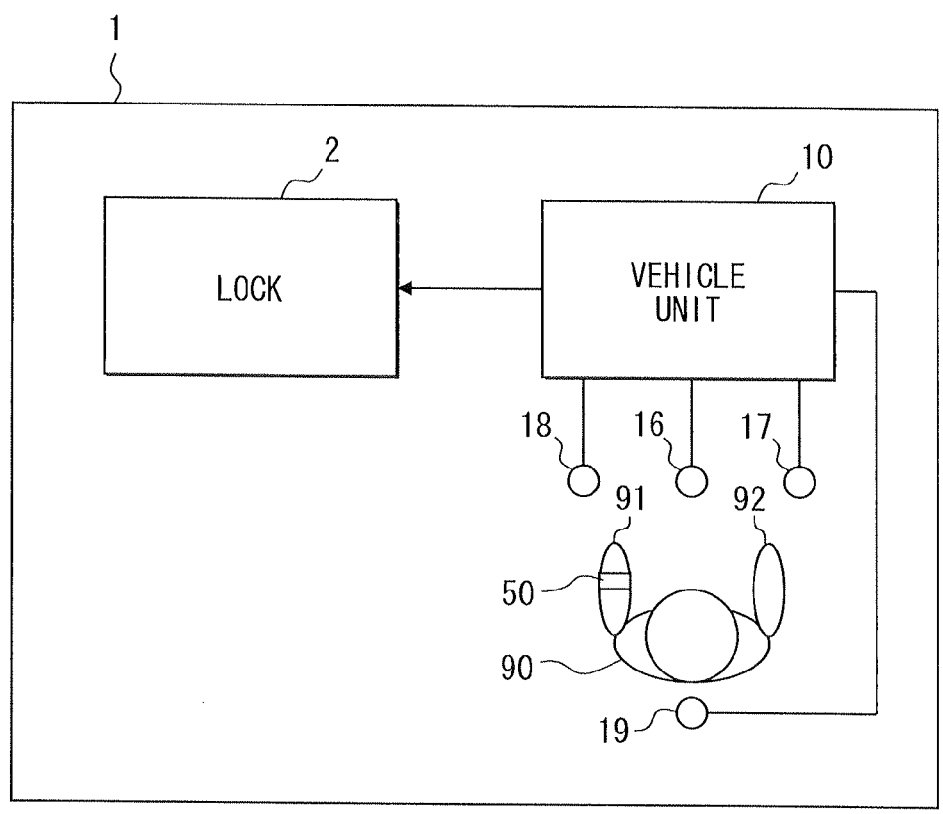
FIG. 1 is a block diagram of configuration of the lock release apparatus in a first embodiment of the present invention.

In the following, a few embodiments of the present invention are described with reference to the drawing. In those embodiments, like parts have like numbers. The description of those embodiments is intended to be concise, and redundant portions may be omitted from the description of the latter embodiments. The combination of the components is not only possible within each of those components, but also possible in an inter-embodiment manner. That is, a part of embodiment A and a part of embodiment B may be combined to make the present invention more fruitful and workable.

First Embodiment

Figure 2:
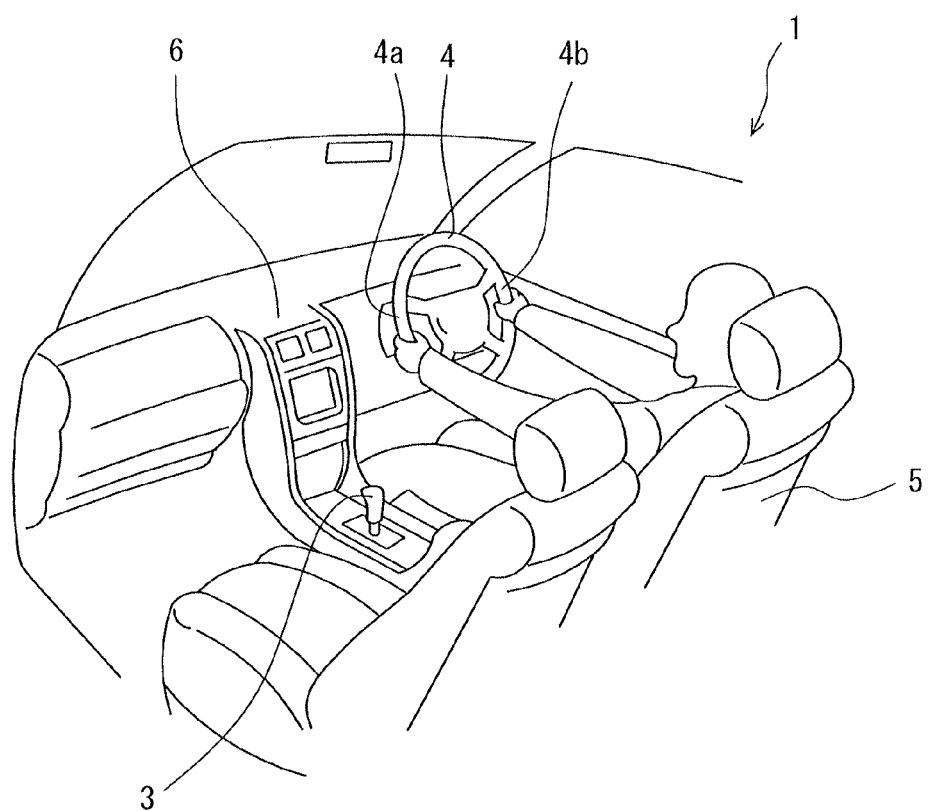
FIG. 2 is a perspective illustration of the reception interface of the lock release apparatus in a vehicle.

FIG. 1 is a block diagram of configuration of the lock release apparatus in the first embodiment of the present invention, and FIG. 2 is a perspective illustration of the reception interface of the lock release apparatus in a vehicle 1.

The present invention is applicable to various lock release apparatuses. The following description is regarding a lock release apparatus for unlocking a lock of a shift lever in the vehicle.

The lock release apparatus of the present embodiment includes a vehicle unit 10 that controls unlocking of a lock mechanism 2 of a shift lever in a vehicle 1, and a portable device 50 carried by a driver 90 of the vehicle 1 as shown in FIG. 1. The portable device 50 is capable of outputting an electric signal, and the vehicle unit 10 receives the signal from the portable device 50 through a signal transmission channel on human body of the driver 90, for controlling the lock mechanism 2.

The portable device 50 of the present embodiment is carried by the driver 90 at, a position that is either right or left of a body center line. In other words, the distance from the device 50 to a left hand 91 and the distance from the device 50 to a right hand 92 are different. In an example shown in FIG. 1, the device 50 is attached to the left arm of the vehicle driver 90. The signal from the device 50 has a frequency that generates a weak electric field only on the surface of human body and its proximity, and the signal from the portable device 50 is generated by frequency modulation for protection against noise tampering.

The vehicle unit 10 includes a microprocessor and a memory which are omitted from illustration, and, it is installed inside of an instrument panel 6 of the vehicle compartment (cf. FIG. 2), for example. The vehicle unit 10 has reception interfaces 16 to 19 to receive a signal from the portable device 50.

The reception interface 16 is disposed on a left side 4a of a steering wheel 4, that is, on the left portion of the wheel 4 when the wheel 4 is held in a position of straight travel of the vehicle 1 as shown in FIG. 2, and the reception interface 17 is disposed on a right side 4b of the steering wheel 4 as shown in FIG. 2. The reception interface 18 is disposed on a shift lever 3 as shown in FIG. 2, and the reception interface 19 is disposed on a seat surface of a driver's seat 5 as shown in FIG. 2, for example.

Figure 3:
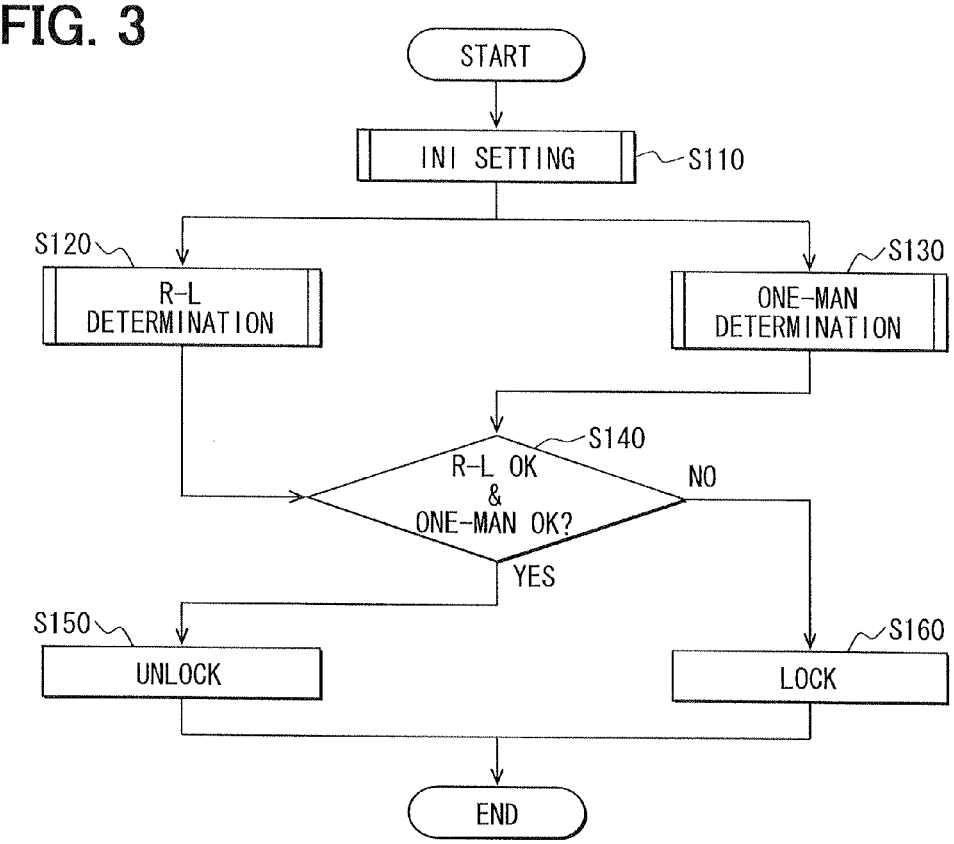
FIG. 3 is a flowchart of an operation of a lock release control performed by a vehicle unit.
Figure 4:
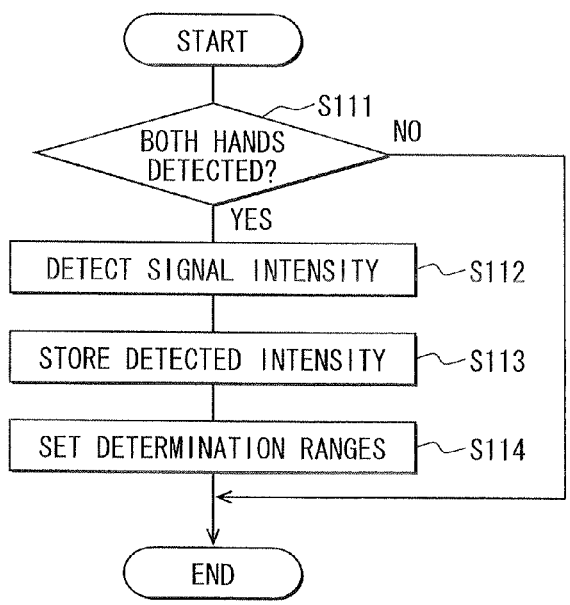
FIG. 4 is a flowchart of an operation of an initial setting processing.
Figure 7:
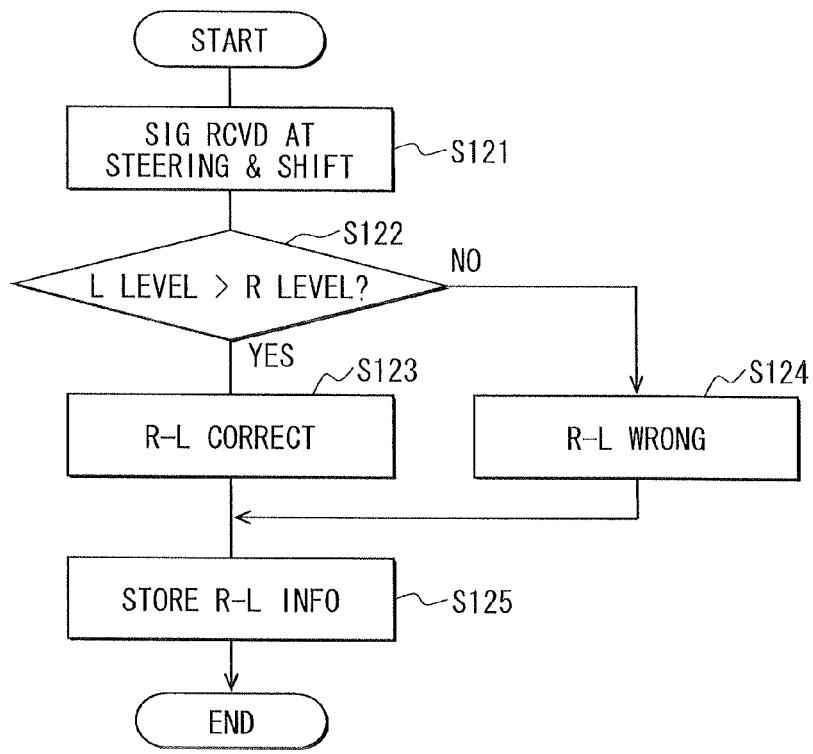
FIG. 7 is a flowchart of an operation of a right/left determination processing.
Figure 8:
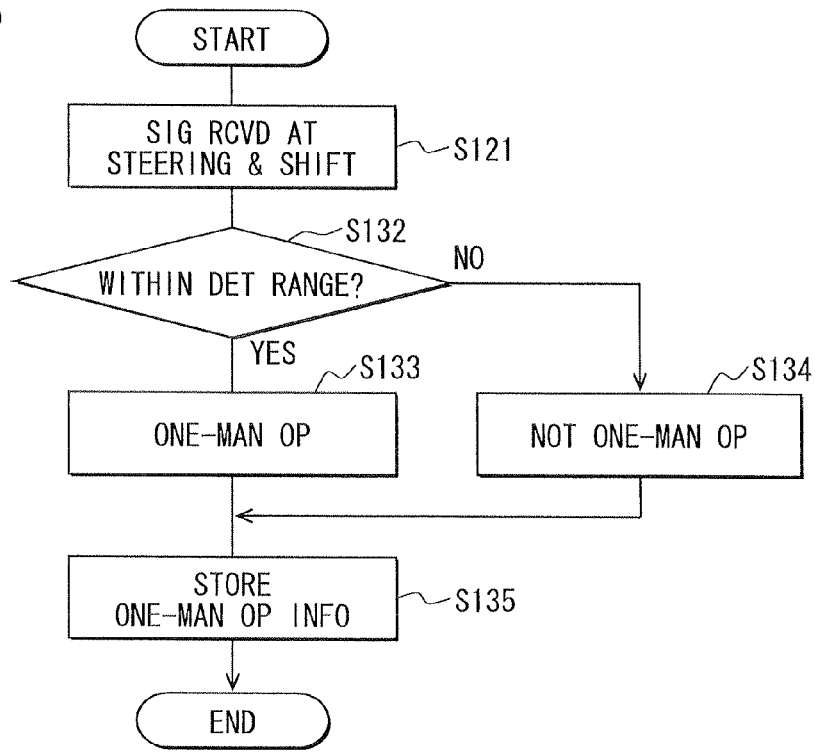
FIG. 8 is a flowchart of an operation of a one-man operation determination processing.

The operation of the lock release apparatus of the above configuration is explained next. FIG. 3 is a flowchart of an operation of a lock release control performed by the vehicle unit 10, and FIG. 4 is a flowchart of an operation of an initial setting processing shown as S110 of FIG. 3. FIG. 7 is a flowchart of an operation of a right/left determination processing shown as S120 of FIG. 3, and FIG. 8 is a flowchart of an operation of a one-man operation determination processing shown as S130 of FIG. 3.

As shown in FIG. 3, when an ignition switch of the vehicle 1 is operated, the vehicle unit 10 of the vehicle 1 and an engine is started, for example, the initial setting processing S110 is performed. The initial setting processing S110 is performed at a timing when a "device" such as the vehicle 1 is started. If the vehicle 1 is an electric car or a hybrid car, the initial setting processing is performed when a start switch enabling the travel of the vehicle 1 is operated.

The initial setting processing S110 determines, as shown in FIG. 4 at S111, whether the vehicle driver 90 touches the steering wheel 4 with both hands after the engine is started (i.e., whether the right hand touches the right side 4b of the steering wheel 4 and the left hand touches the left side 4a of the steering wheel 4). After detecting the touches of both hands of the driver 90 on the steering wheel 4 at S111, then at S112 each of the signal reception levels of the signals received by the reception interfaces 16, 17 is detected, and then at S113 each of the signal reception levels by the right and left interfaces is memorized by memory unit of the vehicle unit 10.

Figure 5:
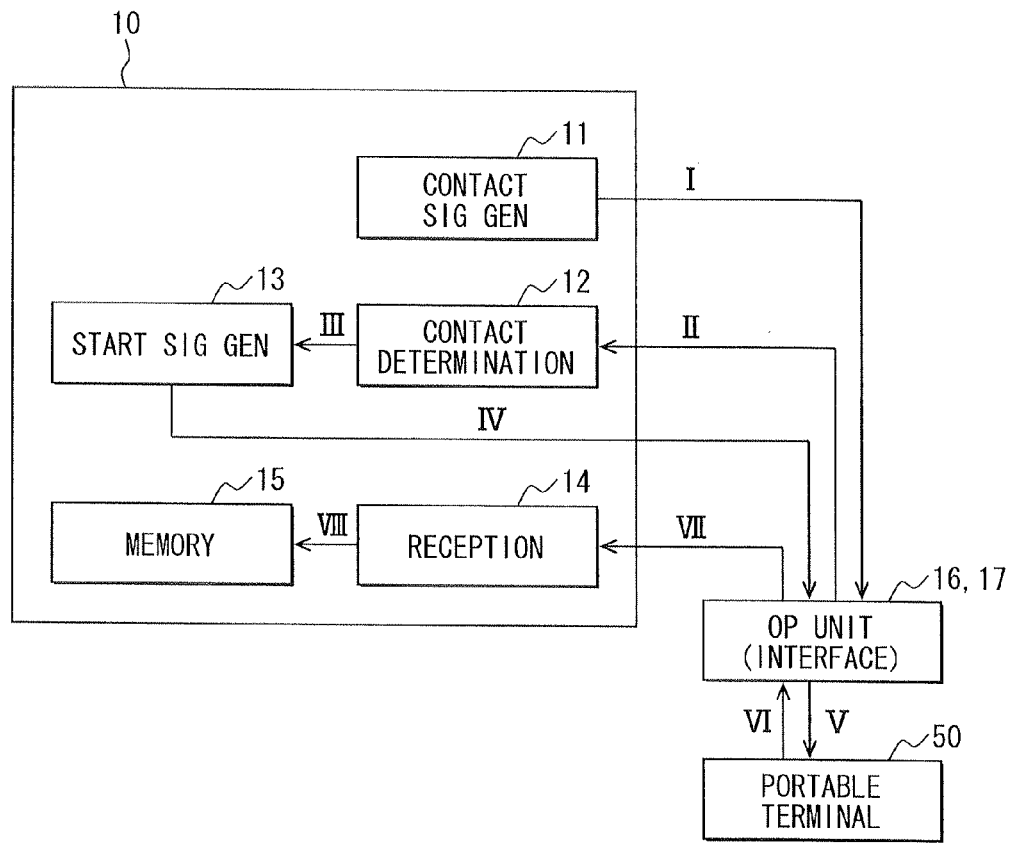
FIG. 5 is a block diagram illustration of the initial setting processing.

An example of the processing operation of the initial setting processing S110 mentioned above is explained with reference to FIG. 5. The vehicle unit 10 has a contact detection signal generation unit 11, a contact determination unit 12, a start signal generation unit 13, a reception unit 14 and a memory unit 15 as shown in FIG. 5.

Because the contact detection signal generation unit 11 is installed in the vehicle unit 10 and receives electricity supply from a large-capacity electricity storage on the vehicle 1, the signal generation unit 11 always generates a weak signal after the engine is started. The contact detection signal generation unit 11 sends a weak alternate electric current which does not include an ID to the reception interfaces 16, 17.

By the weak current supplied to the interfaces 16, 17, the electric current flows between the interfaces 16 and 17 when the driver 90 touches the steering wheel 4, thereby enabling the detection of touching by both hands of the driver 90 on the steering wheel 4, that is, by the right hand touching the right side 4b of the steering wheel 4 and the left hand touching the left side 4a of the steering wheel 4, just like an impedance measurement. Both of the reception interfaces 16, 17 function as an output interface at the time of touch detection. In addition, the method to detect that the vehicle driver 90 is touching the steering wheel 4 with both hands may vary, such as using an electrostatic sensor, using a pressure sensor, using a temperature sensor or the like.

When the contact determination unit 12 determines that the left hand of the vehicle driver 90 is in contact with the left side 4a of the steering wheel 4 and the right hand of the vehicle driver 90 is in contact with the left side 4a of the steering wheel 4, the contact determination unit 12 sends an instruction to the start signal generation unit 13 to generate a wake-up signal to start the operation of the portable device 50 which is carried by the vehicle driver 90. Upon receiving the instruction, the start signal generation unit 13 generates and outputs a wake-up signal, and the wake-up signal is sent to the reception interfaces 16, 17 of the steering wheel 4. The wake-up signal is transmitted to the portable device 50 through the hand from the reception interfaces 16, 17 of the operation unit. The wake-up signal turns on the portable device 50 which has been in a sleep mode. At the time of sending of the wake-up signal, both of the reception interfaces 16, 17 function as an output interface.

In the present example, due to relatively small amount of electricity stored by the electricity storage in the portable device 50, the portable device 50 is in the sleep mode until it receives the wake-up signal for the purpose of saving electricity. However, the portable device 50 may be always in an ON condition. In that case, the above procedure up to this portion is not required.

The portable device 50 outputs the above-mentioned frequency modulated signal after its operation is started. The signal is transmitted through human body of the vehicle driver 90 while it is attenuating, and the signal is received with the reception interface 16 from the left hand, and is received with the reception interface 17 from the right hand, and a pair of signals reaches to the reception unit 14. Then, the reception unit 14 stores the reception level (a signal intensity level) of each signal to the memory unit 15.

Figure 6:
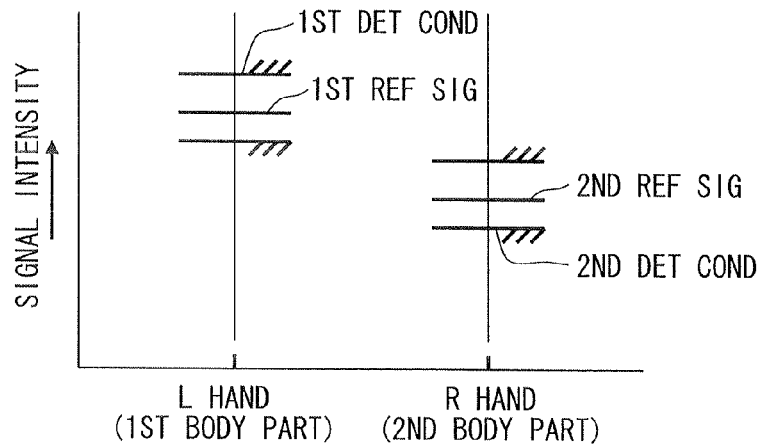
FIG. 6 is a diagram of information memorized in a memory.

After performing S113 shown in FIG. 4, the process proceeds to S114, and the vehicle unit 10 sets right and left determination conditions (the range of the signal intensity level) for permitting the release of the lock of the lock mechanism 2, and the determination conditions are stored in the memory unit 15. After S112 to S114 shown in FIG. 4 are performed, information shown in FIG. 6 is memorized in the memory unit 15, for example.

The signal, which is output from the portable device 50 and is attenuatingly transmitted through a transmission channel on human body to the left hand 91 of the vehicle driver 90, reaches to the reception interface 16 of the reception unit 14, and the signal intensity level at the time of reception by the reception interface 16 is memorized to the memory unit 15. The signal from the left hand 91 serves as the first reference signal. In addition, the signal, which is output from the portable device 50 and is attenuatingly transmitted through a transmission channel on human body to the right hand 92 of the vehicle driver 90, reaches to the reception interface 17 of the reception unit 14, and the signal intensity level at the time of reception by the reception interface 17 is memorized to the memory unit 15. The signal from the right hand 92 serves as the second reference signal. In the present example, due to the attachment position of the portable device 50 on the left arm of the driver 90, the signal intensity level of the second reference signal is lower than the signal intensity level of the first reference signal.

Further, based on the reception signal intensity level of the first reference signal, the first determination condition of the left hand for permitting the release of the lock is set, taking into consideration the attenuation error of the signal during transmission through human body, together with other factors, and, based on the reception signal intensity level of the second reference signal, the second determination condition of the right hand for permitting the release of the lock is set, taking into consideration the attenuation error of the signal during transmission through human body, together with other factors.

The process returns to the top without setting anything when touching of the vehicle driver 90 on the steering wheel 4 with both hands is not detected at Step S111. The monitoring of the driver is continued until detecting touching of the driver 90 on the steering wheel 4 with both hands.

If the initial setting processing S110 shown in FIG. 3 is performed as explained above, the process proceeds to S120 for performing the right/left determination processing, and then the process proceeds to S130 for performing one-man operation determination processing as mentioned above. The right/left determination processing S120 and the one-man operation determination processing S130 may be, performed in parallel, or may be performed sequentially one by one.

The right/left determination processing S120 is started when a signal is received with the right side 4b of the steering wheel 4 and with the shift lever 3 at S121 as shown in FIG. 7.

When the vehicle driver 90 operates the shift lever 3 in a vehicle which has the steering wheel 4 installed on the right side of the vehicle, the driver 90 generally puts the right hand 92 on the right side 4b of the steering wheel 4, and puts the left hand 91 on the shift lever 3 in a normal driving position. Therefore, the shift lever 3 is going to be operated, if a signal is received with both of the reception interface 17 on the right side 4b of the steering wheel 4 and the reception interface 18 of the shift lever 3 at S121.

When the vehicle driver 90 operates the shift lever 3 for releasing the lock of the lock mechanism 2, the shift lever 3 serves as an unlocking operation unit and corresponds to a first position that is touched by the left hand 91 serving as a first body part of the vehicle driver 90 in the present embodiment, and the right side 4b of the steering wheel 4 corresponds to a second position that is touched by the right hand 92 serving as a second body part of the driver 90 in the present embodiment.

When a signal is received with the reception interface 17 on the right side 4b of the steering wheel 4 and with the reception interface 18 of the shift lever 3 at S121, it is determined whether the signal intensity level of the reception interface 18 is higher than the signal intensity level of the reception interface 17 at S122.

When it is determined that the signal intensity level received by the reception interface 18 is higher than the signal intensity level received by the reception interface 17 at S122, that is, when the signal intensity relation (i.e., large-small relation) between the two signals respectively received by the interface 18 and by the interface 17 is determined to be identical with the signal intensity relation between the first reference signal for the left hand and the second reference signal for the right hand stored at S110, the process determines at S123 that the right hand and the left hand are in correct positions (i.e., not in opposite positions).

On the other hand, when it is determined that the signal intensity level received by the reception interface 18 is lower than the signal intensity level received by the reception interface 17 at S122, that is, when the signal intensity relation (i.e., large-small relation) between the two signals respectively received by the interface 18 and by the interface 17 is determined to be reversed with the signal intensity relation between the first reference signal for the left hand and the second reference signal for the right hand stored at S110, the process determines at S124 that the right hand and the left hand are not in correct positions (i.e., in opposite positions).

Then, after either of S123 or S124 is performed, the process proceeds to S125, and information regarding correctness of the positions of the right hand and the left hand determined at S123 or S124 is stored.

The one-man operation determination processing S130 is started, just like the right/left determination processing S120, as shown in FIG. 8, when a signal is received with both of the right side 4b of the steering wheel 4 and the shift lever 3 at S121.

When the signal is received with the reception interface 17 on the right side 4b of the steering wheel 4 and the reception interface 18 of the shift lever 3 at S121, it is determined whether each of the signal intensity levels of the received signals is within a predetermined level range at S132. In other words, it is determined whether the signal intensity level of the left hand side signal received with the reception interface 18 fulfills the first determination condition for the left hand set at S114 (e.g., the signal intensity level falling within the range of the first determination condition shown in FIG. 6) and whether the signal intensity level of the right hand side signal received with the reception interface 17 fulfills the second determination condition for the right hand set at S114 (e.g., the signal intensity level falling within the range of the second determination condition shown in FIG. 6).

When it is determined at S132 that both signal intensity levels of the reception signals are within the predetermined ranges, it is determined at S133 that the operation is performed by one person. That is, the signal intensity level within the predetermined range is interpreted, in consideration of the attenuation error of the signal transmission though human body, that the received signal is not transmitted though a person other than the driver 90.

On the other hand, if it is determined at S132 that at least one of the two signal intensity levels of the reception signals is not within the predetermined ranges, it is determined at S134 that the operation is not performed by one person. That is, the signal intensity level not within the predetermined range is interpreted, in consideration of the attenuation error of the signal transmission through human body, that the received signal is transmitted through a person other than the driver 90, thereby changing the degree of signal attenuation.

After either S133 or S134, the process proceeds to S135, storing the information that the operation is performed by one person, or not by one person, which is determined at S133 or S134.

After the right/left determination processing S120 and the one-man operation determination processing S130 are performed as shown in FIG. 1, the process proceeds to S140, and it is determined, based on the information stored at S125 and S135, that the right hand and the left hand are correctly positioned on the steering wheel 4 as well as the operation is performed by one person. That is, it is determined at S140 whether the driver 90 puts the left hand 91 on the shift lever 3, puts the right hand 92 on the right side 4b of the steering wheel 4, and operates the shift lever 3 with the vehicle driver 90 alone grasping the steering wheel 4.

When it is determined at S140 that the correctness of the right hand and the left hand is assured and the operation is performed by one person, the process proceeds to S150, and the lock mechanism 2 is put in an unlock condition. That is, the shift operation by using the shift lever 3 is enabled by releasing the lock of the lock mechanism 2 for the shift lever 3, because the left hand 91 of the vehicle driver 90 is put on the shift lever 3, the right hand 92 of the vehicle driver 90 is put on the right side 4b of the steering wheel 4, and the shift lever 3 is going to be operated while the vehicle driver 90 alone is grasping the steering wheel 4.

On the other hand, when it is determined at S140 that at least one of two conditions are not fulfilled, that is, the correctness of the right hand and the left hand is not assured or the operation is not performed by one person, the process proceeds to S160, and the locked condition of the lock mechanism 2 is kept unchanged. The non-fulfillment of at least one of two conditions indicates that either (i) the driver 90 is in an abnormal position with the right hand 92 put on the shift lever 3 and/or with the left hand 91 put on the right side 4b of the steering wheel 4, or (ii) the driver 90 is not directly touching the shift lever 3 and the right side 4b of the steering wheel 4, with another person intervening therebetween (e.g., a person touching the driver 90 is also touching the shift lever 3 or the right side 4b of the steering wheel 4).

S110 shown in FIG. 3 corresponds to a determination condition setting step in the present embodiment, and S120, S130, S140, S150, S160 shown in FIG. 3 correspond to an unlocking instruction step in the present embodiment.

When it is determined that the vehicle 1 is started, the vehicle unit 10 of the lock release apparatus in the present embodiment (A) receives the signal with the reception interface 16 on the left side 4a of the steering wheel 4, which is transmitted from the portable device 50 to a transmission channel on human body toward the left hand 91 of the driver 90, and interprets it as the first reference signal for setting the first determination condition of releasing the lock, and (B) receives the signal with the reception interface 17 on the right side 4b of the steering wheel 4, which is transmitted from the portable device 50 to a transmission channel on human body toward the right hand 92 of the driver 90, and interprets it as the second reference signal for setting the second determination condition of releasing the lock.

After setting the determination conditions, the lock condition of the shift lever 3 by the lock mechanism 2 is released when (C) the signal is received with the reception interface 18 of the shift lever 3 to be determined as the first determination signal, and the signal intensity level of the first determination signal is determined to be fulfilling the first determination condition, and (D) the signal is received with the reception interface 17 of the right side 4b of the steering wheel 4 to be determined as the second determination signal, and the signal intensity level of the second determination signal is determined to be fulfilling the second determination condition, and (E) the signal intensity level relation between the first and second determination signals is identical with the signal intensity level relation between the first and second reference signals.

Therefore, the lock condition of the lock mechanism 2 is released only when the vehicle driver 90 alone is determined to be touching the shift lever 3 with his/her body intentionally, expressly and unambiguously positioned to operate the shift lever 3. In other words, the lock condition of the lock mechanism 2 is not released when a person touching the driver 90 operates the shift lever 3 without regard to an intention of the driver 90 or when the driver 90 unintentionally touches the shift lever 3 in a position that is not cased for shift operation. As a result, the lock condition of the shift lever 3 is prevented to be falsely released when the driver 90 having the portable device 50 does not intend to perform a shift operation.

In addition, the vehicle unit 10 controls the release of the lock based on the reception level of the signal output from the portable device 50, and does not compare an ID included in the signal. Therefore, an insoluble problem, such as release of the lock is not performable due to the broken ID or the like, is securely prevented.

The vehicle unit 10 may include a reception interface 19 for detecting seating of the driver in the driver's seat, which serves as a seating detector, and the signal intensity level of the received signal originating from the portable device 50 and transmitted toward the reception interlace 19 through human body may be used to determine the seating of the driver 90. If the driver's seating is determined at S140 together with the correctness of the right hand and the left hand and the one-man operation, the release of the lock is permitted, and if the driver's seating is not determined, the release of the lock is not permitted. In this manner, false release of the lock is securely prevented at a time when the driver 90 is not seated and the intention of the driver 90 for shift operation is not confirmed. Further, the shift operation by the driver 90 positioned with his/her hip rising from the driver's seat is prevented, for the improved driving safety.

The detection of the driver's seating based on the received signal with the reception interface 19 may be performed as setting of a seating determination condition based on a reception of a reference signal at the time of setting the initial setting processing S110, or may be performed as setting of a predetermined seating determination condition without receiving a reference signal. Further, the detection of the driver's seating may use a signal from a pressure-sensing seating sensor installed in a driver's seat, for example.

Furthermore, the vehicle unit 10 may preferably perform the initial setting processing S110 once again, in addition to just after the start of the vehicle 1, at a time when the shift position of the shift lever 3 is set to, a parking position and this setting is released afterwards, or at a time when the parking brake of the vehicle 1 is set to a braking condition and this braking condition is released afterwards after the start of the vehicle 1, for the purpose of receiving the first and second reference signals and updating the first and second determination conditions.

After the start of the vehicle 1, at a time when the shift position of the shift lever 3 is set to a parking position and this setting is released afterwards, or at a time when the parking brake of the vehicle 1 is set to a braking condition and this braking condition is released afterwards, the driver 90 of the vehicle 1 can change a holding position of the portable device 50 easily while the driving operation of the vehicle 1 is interrupted. Therefore, performing S110 once again for receiving the first reference signal and the second standard signal and updating the first determination condition and the second determination condition during such time allows the lock release apparatus to cope with the change of the holding position of the portable device 50.

In addition, repeating of the initial setting processing for the purpose of receiving the first/second reference signals and updating the first/second determination conditions may be performed at predetermined intervals. The initial setting processing repeated at a scheduled time may be performed only when both hands are touching the steering wheel 4, with the delay of the processing to the detection of subsequent touching if the touching of the hands is not detected at the scheduled time. The initial setting processing at the scheduled time may simply be canceled when the hands are not touching.

Second Embodiment

The second embodiment is explained with reference to FIG. 9 next.

The present embodiment is an example of the present invention applied to a machine tool. In addition, like parts as to the first embodiment have like numbers in the present embodiment, and explanation of those parts is omitted.

Figure 9:
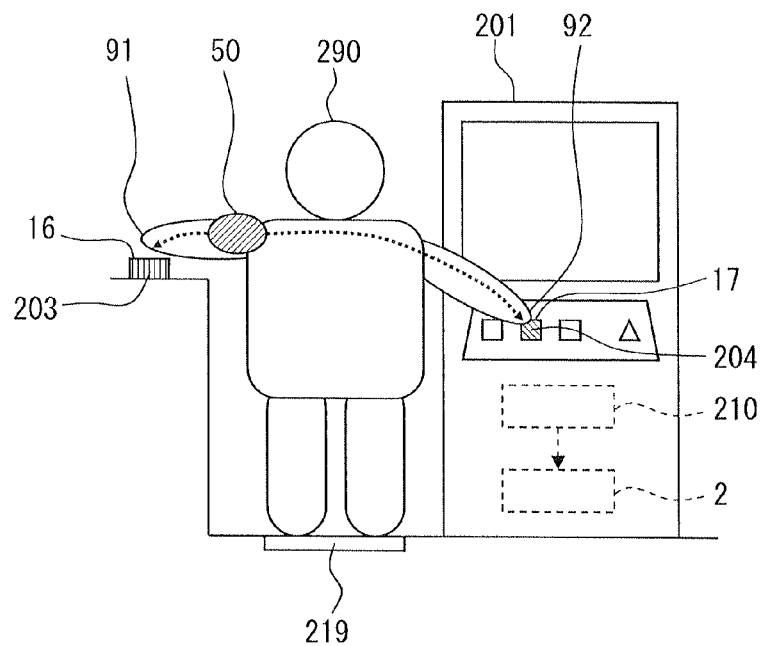
FIG. 9 is a block diagram of a lock release apparatus in a second embodiment of the present invention.

As shown in FIG. 9, the lock release apparatus of the present embodiment includes a controller 210 which controls a release of lock of the lock mechanism 2 of an operational part of a machine tool 201, and the portable device 50 which, for example, is attached to the left arm of an operator 290 of the machine tool 201. In the present embodiment, the machine tool 201 corresponds to a device, and the right hand 92 of the operator 290 operating the machine tool 201 corresponds to a first body part, and the left hand 91 of the operator 290 corresponds to a second body part.

The machine tool 201 has the operation part that is operated by a so-called "both hands" switch having the first operation button 203 that is supposed to be operated by the right hand and the second operation button 204 that is supposed to be operated by the left hand. The reception interface 16 is disposed on the first operation button 203, and the reception interface 17 is disposed on the second operation button 204. Further, at least one of the two buttons 203, 204 corresponds to the unlocking operation unit.

The controller 210 performs the same control as the vehicle unit 10 in the first embodiment. However, in the right/left determination processing S120 and S121 of the one-man operation determination processing S130, each of the reception interface 16 on the first operation button 203 and the reception interface 17 on the second operation button 204 is used to receive the signal.

In the present embodiment, when the operation of the machine tool 1 is started, the machine tool 201 receives a signal from the portable device 50 by the reception interface 16 on the first operation button 203 as the first reference signal through the transmission channel on human body toward the left hand 91 of the operator 290, and sets the first determination condition of permitting release of the lock based on the reception signal intensity level of the first reference signal, and the machine tool 201 receives a signal from the portable device 50 by the reception interface 17 on the second operation button 204 as the second reference signal through the transmission channel on human body toward the right hand 92 of the operator 290, and sets the second determination condition of permitting release of the lock based on the reception signal intensity level of the second reference signal.

After setting the determination conditions, the lock condition of the lock mechanism 2 is released when (i) the signal is received by the reception interface 16 to be serving as the first determination signal and the reception signal intensity level of the first determination signal fulfills the first determination condition, and (ii) the signal is received by the reception interface 17 to be serving as the second determination signal and the reception signal intensity level of the second determination signal fulfills the second determination condition, and (iii) the reception signal intensity level relationship between the first and second determination signals is identical with the reception signal intensity level relationship between the first and second reference signals.

Therefore, when the first and second operation buttons 203, 204 are touched, the release of the lock condition of the lock mechanism 2 is enabled on condition that (i) the operator 290 is operating alone and (ii) the operator 290 is in a position that is taken with an intention to operate the first and second operation buttons 203, 204. For example, when another person touching the operator 290 inadvertently touches one of the first and second operation buttons 203, 204 while the operator 290 is touching the other one of the first and second operation buttons 203, 204, or when the operator 290 inadvertently touches both of the first and second operation buttons 203, 204 in a position that indicates no intention to operate the machine tool 201 such as turning his/her back to the tool 201, the lock of the lock mechanism 2 will not be released. In this manner, false release of the lock of the lock mechanism 2 is prevented when the operator 290 having the portable device 50 has no intention to operate the operation part of the machine tool 201.

In addition, the controller 210 controls release of the lock based on the reception level of the signal output from the portable device 50, and does not compare an ID included in the signal. Therefore, an insoluble problem, such as release of the lock is not performable due to the broken ID or the like, is securely prevented.

The controller 210 may include a reception interface 219, which serves as a standing position detector for detecting whether the operator 290 is standing at a correct operation position, and the signal intensity level of the received signal, originating from the portable device 50 and transmitted toward the reception interface 219 through human body, may be used to confirm that the operator 290 is standing at the correct operation position. When it is further confirmed at S140 that all of the following conditions are fulfilled, that is, (i) the operator 290 is facing the machine tool 201 (i.e., correctness of the right and left hands), (ii) the operator 290 alone is operating, and (iii) the operator 290 is standing at the correct operation position, the lock is released. When the correct operation position of the operator 290 is not confirmed, the lock will not be released. Therefore, if the operator 290 is not standing in the correct operation position, with the unnatural position, for example, the operation of the operation part will be prohibited, thereby providing the improved operation safety, even when both of the first and second operation buttons 203, 204 are simultaneously operated.

The detection of the standing position of the operator 290 based on the received signal the reception interface 219 may be performed by receiving a reference signal and setting a determination condition, at a time of performing the initial setting processing S110, or may be performed by using a predetermined determination condition without receiving a reference signal. In addition, the detection, of the standing position may utilize the signal from a pressure-sensing device installed on a floor or the like.

Other Embodiments

Beside aforesaid few embodiments of the present invention, various modifications and additions may be incorporated in a scope of the present invention without limiting to the present invention and without deviating from a spirit of the present invention.

In each of the above embodiments, the initial setting processing S110 stores the reception levels of the first/second reference signals, and the first determination condition for the left hand is set based on use the reception level of the first reference signal, and the second determination condition for the left hand is set based on use the reception level of the second reference signal, for permitting release of the lock. Further, in FIG. 6, the maximum/minimum values are defined, and the determination condition is specified as a condition that a difference between the maximum value and the reference signal reception level is larger than a difference between the minimum value and the reference signal reception level. However, this condition may be modified in the following manner.

For example, the determination condition is a condition that a difference between the maximum value and a reference signal reception level may be equal to a difference the minimum value and reference signal reception level. That is, the reference signal reception level is at a center of the maximum value and the minimum value. Further, the determination condition may have the minimum value only. By setting the minimum value to a threshold that takes into account the signal transmission attenuation by one person's body with its dispersion, the release of the lock is allowed only for the holder of the portable device 50. As a result, false release of the lock is securely prevented for the improved safety.

In addition, though the present invention is applied to a lock release apparatus releasing the shift lever lock of the vehicle 1 in the above-mentioned first embodiment, the present invention may be applied to the other lock mechanisms, such as a lock releasing of a child lock, a lock releasing of a window lock, or the like. Further, multiple lock mechanisms may be controlled by the present invention, with the commonalization of determination conditions of releasing multiple locks. For example, when both hands of the vehicle driver 90 touches the steering wheel 4 of the vehicle 1, the initial setting processing S110 is performed, and the first/second determination conditions are set, for performing all of releasing of the shift lever lock, the child lock, and the window based on thus-determined first/second determination conditions.

Further, the right/left determination processing S120 as well as correctness determination based on the determination result of S120 in the above embodiments may be omitted. For example, in case that the minimum value of the first determination condition is certain to be higher than the maximum value of the second determination condition as shown in FIG. 6, the right/left determination processing S120 as well as correctness determination based on the determination result of S120 in the above embodiments can be omitted.

Furthermore, signal reception positions may be varied from the above embodiments. That is, the reception interfaces 16, 17, 18, may be separately used for receiving the reference signals and the determination signals, and/or the interfaces 16, 17, 18 may be used in combination for the same purpose.

The signal reception positions for receiving the first/second reference signals are preferably determined as positions that can easily be touched by the first/second body parts of the device operator standing/sitting in a normal operation posture when the operation of the device is started by the operator.

The signal reception positions for receiving the first/second determination signals are preferably determined as positions that are touched by the first/second body parts of the operator when the operator intends to release the lock by operating the unlocking operation unit. That is, at least one of the signal reception positions is preferably determined as the unlocking operation unit. For example, when releasing the window lock, a window lock release switch may be determined as one of the first/second predetermined positions.

The first/second body parts may be determined as not only the right and left hands, but also the hand and the foot. The reception interfaces for receiving the signals are required to be disposed at around the feet of the operator if the first and second body parts are determined to be the hand and the foot in the vehicle 1. The foot pedal or the foot rest may serve as one of the reception interfaces. The foot pedal reception interface may preferably be the brake pedal. However, for releasing the lock of the window or the shift lever, the reception interface may be disposed on the accelerator pedal, in order to allow the releasing operation during the travel of the vehicle 1.

Figure 10:
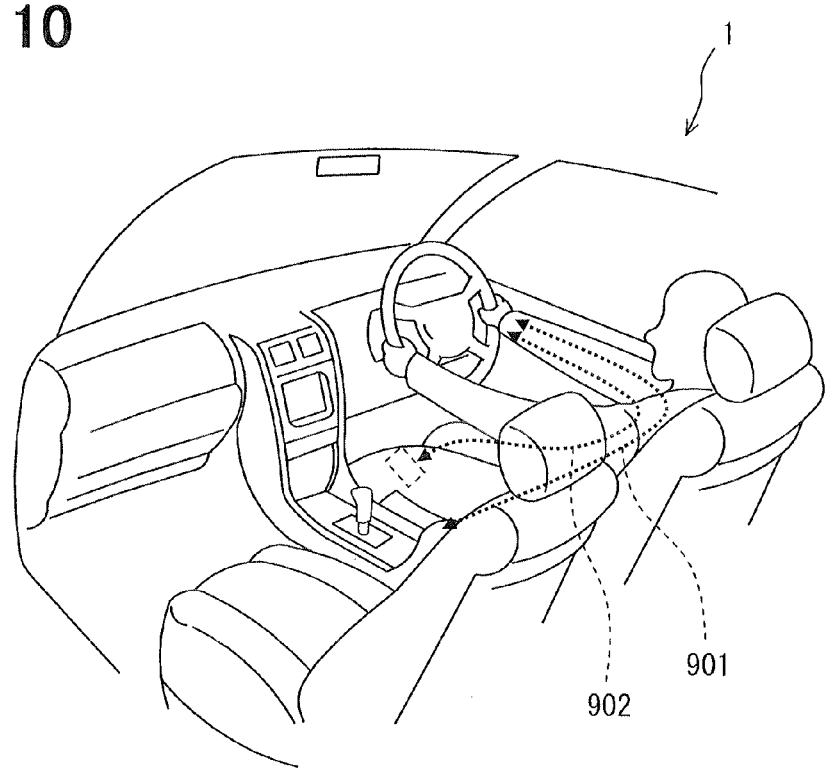
FIG. 10 is an illustration of the combination of signal reception positions in the vehicle in another embodiment.
Figure 11:
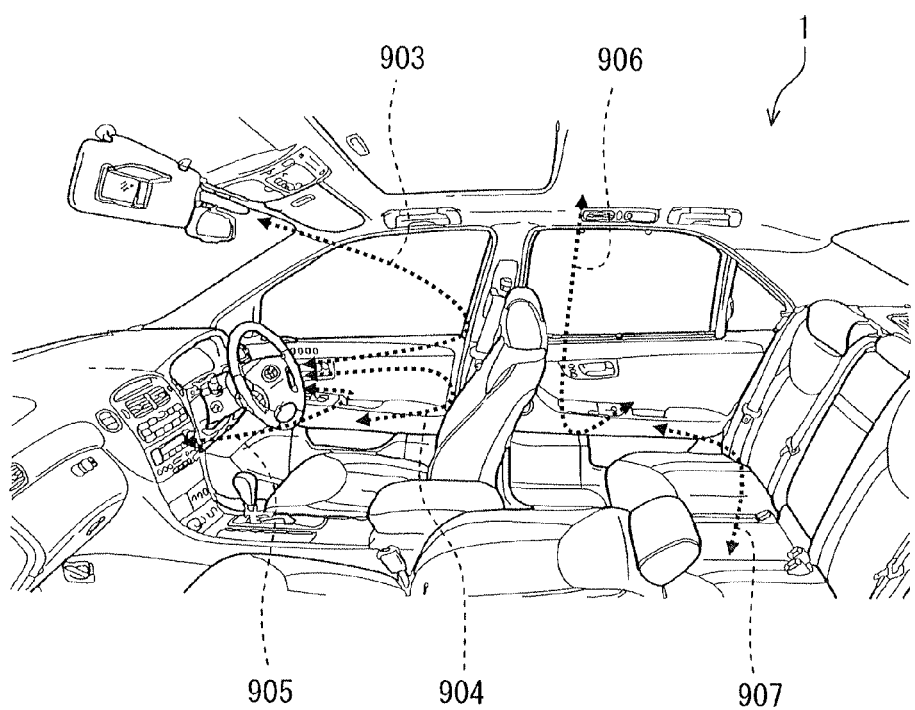
FIG. 11 is an illustration of the combination of signal reception positions in the vehicle in yet other embodiments.

FIGS. 10 and 11 illustrate combinations of signal reception positions in the vehicle 1, that is, combinations of positions of reception interfaces for receiving reference signals and determination signals through human body, which are different from the example shown in the first embodiment.

A combination 901 in FIG. 10 shows a signal channel between the right side of the steering wheel and the armrest. A combination 902 in FIG. 10 shows a signal channel between the right side of the steering wheel and the foot pedal (e.g., an accelerator pedal, a brake pedal). Both of these combinations are usable as reception positions. Further, various modifications such as a combination 903 in FIG. 11 between the right side of the steering wheel and a position around a room lamp, a room mirror, a combination 904 in FIG. 11 between the right side of the steering wheel and a front door, a combination 905 between the right side of the steering wheel and operation switches for controlling a navigation apparatus, an audio device, an air-conditioner or the like in the center console/instrument panel, a combination 906 between a rear door and a position around a roof/room lamp, a combination 907 between two rear doors, together with other combinations may be usable.

In addition, the present invention may be applied not only to the vehicle and the machine tool in the above embodiments, but also to the other apparatuses and the like which are equipped with the lock mechanism.

In the above embodiments, the reference signals received at different positions (i.e., different signal interfaces) are considered to be the same signal from the portable device. In other words, a single signal transmitted from the portable device follows two different signal channels on the driver's/operator's body to reach two different signal interfaces substantially at the same time.

Such changes, modifications, and summarized scheme are to be understood as being within the scope of the present disclosure as defined by appended claims.

What is claimed is:

1. A lock release apparatus comprising:
a control unit for controlling unlocking of a lock of a device when an unlocking operation unit of the device is operated; and
a portable terminal for outputting a signal when the portable terminal is carried by an operator of the device, wherein
the unlocking of the lock is performed by an operation of the unlocking operation unit by the operator, with a first body part of the operator placed on a first position of the device and a second body part of the operator placed on a second position of the device,
when the device is started, the control unit performs a determination condition setting step by (a-1) receiving, as a first reference signal, a signal transmitted to the first body part from the portable terminal through an operator body and (a-2) setting a first determination condition for the unlocking of the lock based on a signal intensity of the first reference signal, and by (b-1) receiving, as a second reference signal, a signal transmitted to the second body part from the portable terminal through the operator body and (b-2) setting a second determination condition for the unlocking of the lock based on a signal intensity of the second reference signal, and
when the unlocking operation unit is operated after performing the determination condition setting step, the control unit performs an unlocking instruction step to send an unlocking instruction to the lock by (c-1) receiving a signal received at the first position of the device which is recognized as a first determination signal and (c-2) comparing the first determination signal to the first determination condition and determining that the first determination signal fulfills the first determination condition, and by (d-1) receiving a signal received at the second position of the device which is recognized as a second determination signal and (d-2) comparing the second determination signal to the second determination condition and determining that the second determination signal fulfills the second determination condition.

2. The lock release apparatus of claim 1, wherein
even if, at a time the unlocking operation unit is operated and the signal intensity of the first determination signal fulfills the first determination condition and the signal intensity of the second determination signal fulfills the second determination condition, the control unit stops the sending of the unlocking instruction to the lock, when (a) the signal intensity of the second reference signal is higher than the signal intensity of the first reference signal and the signal intensity of the second determination signal is lower than the signal intensity of the first determination signal, or (b) the signal intensity of the second reference signal is lower than the signal intensity of the first reference signal and the signal intensity of the second determination signal is higher than the signal intensity of the first determination signal.

3. The lock release apparatus of claim 2, wherein
the device is a vehicle, and the operator is a driver of the vehicle.

4. The lock release apparatus of claim 3, wherein
the first body part is a left hand of the driver and the second body part is a right hand of the driver.

5. The lock release apparatus of claim 3, wherein
the first body part is a hand of the driver and the second body part is a foot of the driver.

6. The lock release apparatus of claim 3, wherein
the vehicle is equipped with a seating detector for detecting whether the driver is seated in a driver's seat, and
the control unit stops the sending of the unlocking instruction to the lock when the seating detector is not detecting the driver's seating.

7. The lock release apparatus of claim 3, wherein
the control unit updates the first determination condition and the second determination condition by repeating the determination condition setting step when (a) the vehicle in operation has a shift lever of an automatic transmission set at a parking position with the parking position setting released afterwards, or (b) the vehicle in operation has a parking brake set at a braking condition with the braking condition released afterwards.

8. The lock release apparatus of claim 1, wherein
the device is a machine tool.

9. The lock release apparatus of claim 8, wherein
the first body part is a left hand and the second body part is a right hand.

10. The lock release apparatus of claim 8, wherein
the machine tool is equipped with a standing position detector for detecting whether the operator is standing at an operation position, and
the control unit stops the sending of the unlocking instruction to the lock when the standing position detector is not detecting that the operator is standing at the operation position.

* * * * *